(12) United States Patent
Selvaraj et al.

(10) Patent No.: US 12,400,487 B2
(45) Date of Patent: Aug. 26, 2025

(54) SYSTEM AND METHOD FOR SUGGESTING OPERATIONAL ZONES FOR A WORKSITE ON A DEVICE

(71) Applicant: Caterpillar Inc., Peoria, IL (US)

(72) Inventors: Vishnu Gaurav Selvaraj, Trichy (IN); Rajesh Ramamoorthy, Kovilpatti (IN); Abhishekavalil Krishnan, Chennai (IN); Shashank Karrthikeyaa Annadanam Subbarathinam, Erode (IN); Prasanth Prasad, Palakkad (IN)

(73) Assignee: Caterpillar Inc., Peoria, IL (US)

( * ) Notice: Subject to any disclaimer, the term of this patent is extended or adjusted under 35 U.S.C. 154(b) by 278 days.

(21) Appl. No.: 18/198,405

(22) Filed: May 17, 2023

(65) Prior Publication Data
US 2023/0377378 A1 Nov. 23, 2023

(30) Foreign Application Priority Data

May 17, 2022 (IN) .............................. 202211028232

(51) Int. Cl.
*G06F 3/0484* (2022.01)
*G07C 5/00* (2006.01)

(52) U.S. Cl.
CPC ........... *G07C 5/004* (2013.01); *G06F 3/0484* (2013.01); *G07C 5/008* (2013.01)

(58) Field of Classification Search
CPC ....... G07C 5/004; G07C 5/008; G06F 3/0484; G06F 3/0481; G06F 3/04842; G06F 3/048; G06F 2203/04807
See application file for complete search history.

(56) References Cited

U.S. PATENT DOCUMENTS

| | | | |
|---|---|---|---|
| 8,694,029 | B2 | 4/2014 | Soulie |
| 10,208,453 | B2 | 2/2019 | Taylor et al. |
| 10,319,056 | B1 | 6/2019 | Perez et al. |
| 10,616,707 | B2 | 4/2020 | McLarty et al. |
| 10,872,302 | B2 | 12/2020 | Selvaraj et al. |
| 2019/0180627 | A1* | 6/2019 | Talmaki ................... G08G 1/20 |
| 2020/0026566 | A1 | 1/2020 | Baggerman |
| 2020/0193342 | A1* | 6/2020 | Selvaraj ............... G07C 5/0808 |

(Continued)

OTHER PUBLICATIONS

First Examination Report for Indian Patent Appln. No. 202211028232, mailed Apr. 24, 2025 (19 pgs).

*Primary Examiner* — Jeanette J Parker (57) ABSTRACT

A method for suggesting and facilitating customization of one or more operational zones for a worksite on a device having a Graphical User Interface (GUI). The method includes obtaining, by a processor, operational data associated with at least one type of machine and displaying, by the processor, one or more operational areas corresponding to the one or more operational zones on the GUI based on the operational data meeting a threshold condition. The method further includes receiving one or more user inputs from the GUI to modify the one or more operational areas displayed on the GUI and updating, by the processor, the threshold condition based on the one or more user inputs to generate an updated threshold condition. The method includes reconfiguring, by the processor, the one or more operational areas for subsequent display on the GUI if operational data subsequently received satisfies the updated threshold condition.

19 Claims, 6 Drawing Sheets

(56) References Cited

U.S. PATENT DOCUMENTS

| | | |
|---|---|---|
| 2020/0369290 A1 | 11/2020 | Cherney |
| 2021/0004744 A1* | 1/2021 | Petrany .................. G07C 5/008 |
| 2021/0158674 A1* | 5/2021 | Cherney ................ G06Q 50/08 |
| 2021/0270632 A1 | 9/2021 | Lo et al. |

* cited by examiner

SYSTEM AND METHOD FOR SUGGESTING OPERATIONAL ZONES FOR A WORKSITE ON A DEVICE

TECHNICAL FIELD

The present disclosure relates, in general, to a method and a system for suggesting and customizing the suggested operational zones for a worksite to a user using a device e.g., a handheld device equipped with a Graphical User Interface (GUI).

BACKGROUND

Various stakeholders to construction and mining such as mine site owners, machine fleet owners, operators, or customers may deploy a fleet of machines consisting of one or more types of machines, for example, loaders and haulers at a worksite such as a mine site, a landfill, a quarry, or a construction site. These machines may be used to move materials from one operational zone to another operational zone of the worksite. For example, these machines may move earth or ore from a load zone to a dump zone of the worksite. For operations to be profitable to the stakeholders, these machines should be productively and efficiently operated within and between the operational zones. However, sub-optimal designations of one or more operational zones in the worksite may result in poor productivity and efficiency of the machines.

U.S. Pat. No. 10,872,302 ('302 reference) relates to a control system including a telemetry module associated with the machine to generate signals indicative of operational data of the machine. A controller processes the signals to create a data model based on the operational data of the machine and identifies multiple operational zones over a worksite based on an analysis of the created data model. The controller determines occurrence of work cycles of the machine over the worksite based on the identified operational zones and determines productivity data of the worksite based on the identified work cycles. However, the '302 reference does not suggest or allow customization of the operational zones.

SUMMARY

In one aspect, the present disclosure relates to a computer-implemented method for suggesting and facilitating customization of one or more operational zones for a worksite by a user on a device having a Graphical User Interface (GUI). The method includes obtaining, by a processor, operational data associated with at least one type of machine within the worksite. The operational data is indicative of a type of the operational zone including one of a load zone, a dump zone, and a park zone. The method further includes displaying, by the processor, one or more operational areas corresponding to the one or more operational zones on the GUI of the device based on the operational data meeting a threshold condition and receiving, by the processor, one or more user inputs from the GUI of the device to modify the one or more operational areas displayed on the GUI of the device. Further, the method includes updating, by the processor, the threshold condition based on the one or more user inputs to generate an updated threshold condition and reconfiguring, by the processor, the one or more operational areas for subsequent display on the GUI of the device if operational data subsequently received at the processor satisfies the updated threshold condition.

In another aspect, the present disclosure is directed to a device for suggesting and facilitating customization of one or more operational zones for a worksite by a user. The device includes a memory and a processor communicatively coupled to the memory. The memory stores instructions executable by the processor, and wherein upon execution of the stored instructions the processor is configured to obtain operational data associated with at least one type of machine within the worksite. The operational data is indicative of a type of the operational zone including one of a load zone, a dump zone, and a park zone. The processor is further configured to display one or more operational areas corresponding to the one or more operational zones on a Graphical User Interface (GUI) of the device based on the operational data meeting a threshold condition and receive one or more user inputs from the GUI of the device to modify the one or more operational areas displayed on the GUI of the device. Further, the processor is configured to update the threshold condition based on the one or more user inputs to generate an updated threshold condition and reconfigure the one or more operational areas for subsequent display on the GUI of the device if operational data subsequently received at the processor satisfies the updated threshold condition.

In yet another aspect, the present disclosure is directed towards a non-transitory computer readable medium having stored thereon a code comprising a set of instructions. The set of instructions when executed by a processor of a computer configure the processor to obtain operational data associated with at least one type of machine within the worksite. The operational data is indicative of a type of the operational zone including one of a load zone, a dump zone, and a park zone. The processor is further configured to display one or more operational areas corresponding to the one or more operational zones on a Graphical User Interface (GUI) of the device based on the operational data meeting a threshold condition and receive one or more user inputs from the GUI of the device to modify the one or more operational areas displayed on the GUI of the device. Further, the processor is configured to update the threshold condition based on the one or more user inputs to generate an updated threshold condition and reconfigure the one or more operational areas for subsequent display on the GUI of the device if operational data subsequently received at the processor satisfies the updated threshold condition.

DETAILED DESCRIPTION

Reference will now be made in detail to specific embodiments or features, examples of which are illustrated in the accompanying drawings. Wherever possible, the same reference numbers will be used throughout the drawings to refer to the same or the like parts.

Figure 1:
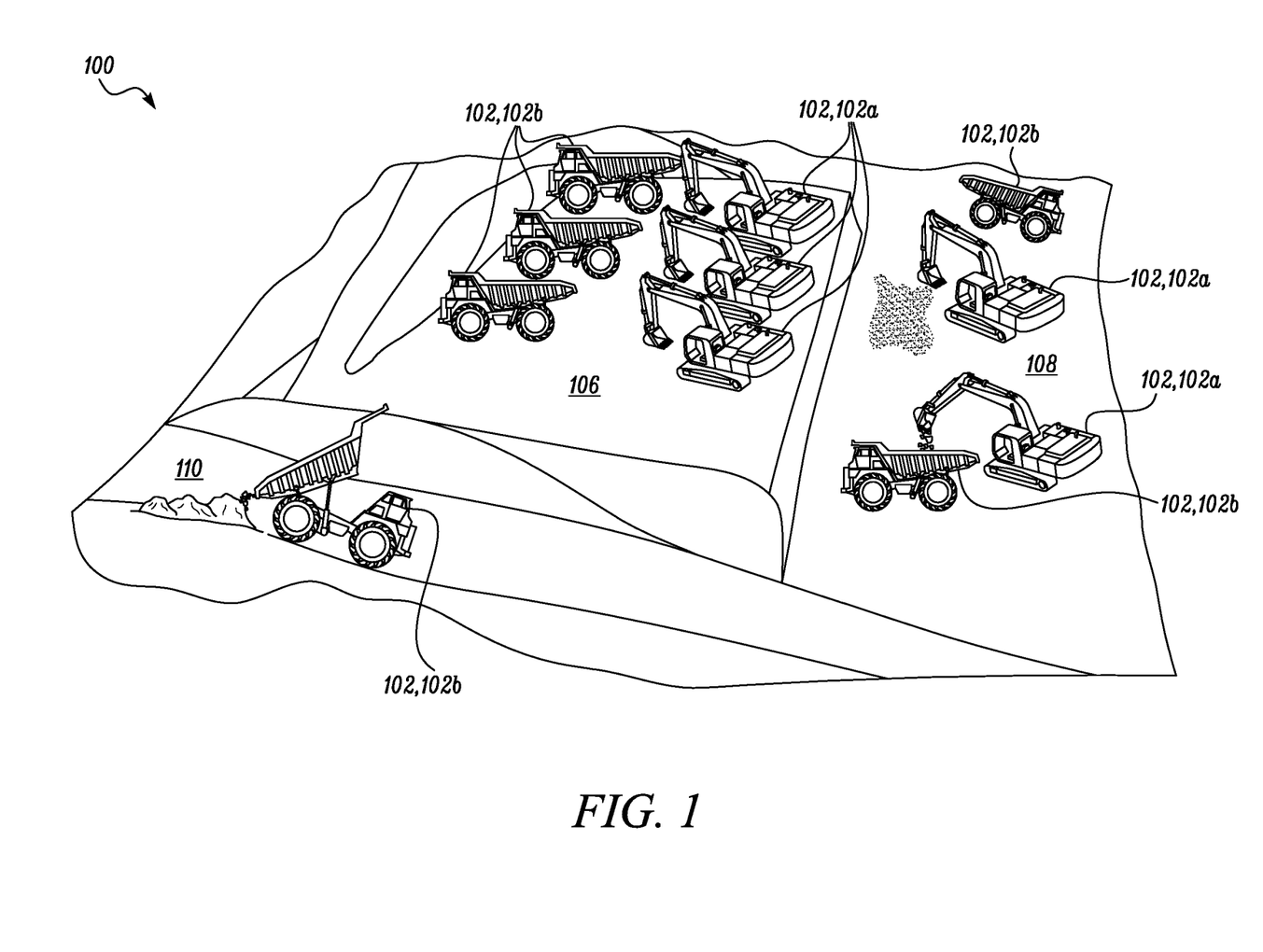
FIG. 1 illustrates an exemplary worksite with multiple operational zones, according to an embodiment of the present disclosure.

Referring to FIG. 1, an exemplary worksite 100 is shown. The worksite 100 may include, but are not limited to, a mining site, a landfill, a quarry, a construction site, or any other site in which movement of materials is desired. The worksite 100 may include numerous types of machines 102, for example loaders 102a and/or haulers 102b, working at the worksite 100. Loaders 102a may include wheel loaders, excavators, shovels, and other similar machines that may be used to scoop material using a bucket and unload the scooped material onto haulers 102b. Haulers 102b may include machines, e.g., dump trucks having a dump body into which the material may be received at one location and carried away to another location within the worksite 100. The machines 102 may be employed for a variety of earth moving operations, such as scooping material out of a pile and transporting/hauling the scooped material from a first location to a second location different from the first location.

The worksite 100 may be typically divided into various operational zones such as, a park zone 106, a load zone 108, and a dump zone 110. The machines 102 may perform various operations in corresponding zones on the worksite 100. For example, loaders 102a may be configured to dig work materials such as earth, sand, or ore at the load zone 108 and load the dug work materials on haulers 102b. Haulers 102b may be configured to transport the work material from the load zone 108 to the dump zone 110. Each hauler 102b may perform several sequences of operations between the load zone 108 and the dump zone 110 to complete an operation. At some instances, when loaders 102a and haulers 102b are not in an operating state, loaders 102a and haulers 102b may be parked, or stated differently, configured to remain stationary at the park zone 106.

In embodiments herein, operational data associated with each machine 102 is capable of being continuously, or, periodically transmitted using suitable hardware, for example, one or more transmitters relaying information from one or more sensors. Operational data associated with the machine 102 may include, but is not limited to, one or more of a distance of the machine 102 from other machines 102 at the worksite 100, a duration for which the distance of the machine 102 from other machines 102 remains unchanged, and an idle time of the machine 102. Operational data received from a hauler 102b may include for example, a distance of the hauler 102b with respect to loaders 102a, the duration for which the distance of the hauler 102b with respect to loaders 102a is constant i.e., remains unchanged, and the idle time of the hauler 102b. In accordance with embodiments herein, this operational data is indicative of a type of the operational zone including one of the park zone 106, the load zone 108, and the dump zone 110. For instance, if the distance of the hauler 102b with respect to the loader 102a at a particular location of the worksite 100 is less than a threshold distance and the duration for which the distance remains unchanged is greater than or equal to a threshold duration, then it indicates that the portion of the worksite 100 on which these machines 102 are present could be a load zone 108. In another example, if an idle time of a machine 102 at a particular location is greater than or equal to a threshold idle time, then it indicates that the portion of the worksite 100 on which this machine 102 is present could be a park zone 106.

In some alternate embodiments, locations and engine start and stop occurrences associated with each machine 102 is capable of being continuously, or periodically, transmitted using suitable hardware, for example, the one or more transmitters relaying information from one or more sensors. In such cases, the operational data associated with a machine 102 is obtained based on the locations and the engine start and stop occurrences of the corresponding machine 102 as described hereinafter. The periodicity of data transmission from the machines 102 may vary based on various worksite parameters such as network connectivity, location of the worksite 100, communication hardware of the machines 102 and other factors known commonly to persons skilled in the art.

Figure 2:
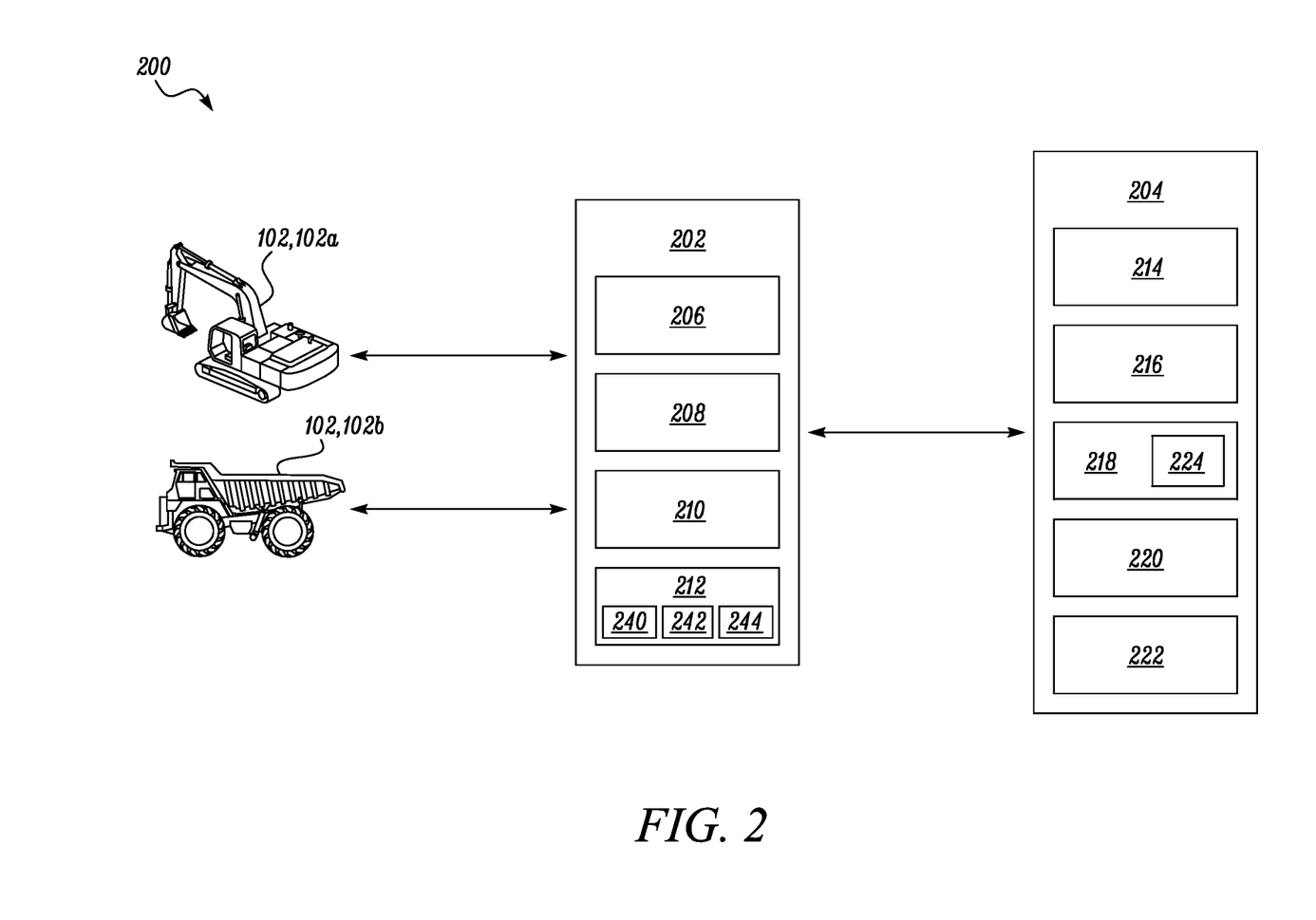
FIG. 2 illustrates an environment implementing an exemplary system for suggesting and customizing the suggested operational zones for the worksite on a device, according to an embodiment of the present disclosure.

Referring to FIG. 2, an environment 200 implementing an exemplary system 202 for suggesting and customizing the suggested operational zones 106, 108, 110 for the worksite 100 is illustrated. In addition to the system 202, the environment 200 also includes a user device 204 and one or more machines, such as the loader 102a and the hauler 102b, communicating with the system 202 over a communication network. Although not shown, a person skilled in the art would appreciate that the communication network may include, but is not limited to, a wide area network (WAN), a cellular network, or a local area network (LAN) employing a variety of communication protocols without limitation thereto as would be commonly known to persons skilled in the art.

The system 202 is configured to suggest and facilitate customization of the operational zones 106, 108, 110, by a user on the user device 204. The system 202 may include numerous electrical and electronic components that are coupled using signal conditioning circuitry, power circuitry, logic circuitry providing power, operational control, communication, and other system associated hardware known to persons skilled in the art.

It will be acknowledged by persons skilled in the art that FIG. 2 depicts the system 202 in a simplified manner and a practical embodiment may include additional components and suitably configured logic to support known or conventional operating features that are not described in detail herein. It will also be acknowledged by persons skilled in the art that the system 202 may be a personal computer, desktop computer, tablet, smartphone, or other computing devices known to persons skilled in the art. It will be acknowledged by persons skilled in the art that the system 202 may alternatively function within a remote server, cloud computing device, or other local or remote computing environment.

Wherever the context so applies in the present disclosure, the term "processor" may be regarded as being inclusive of one or more microprocessors, microcontrollers, digital signal processors (DSPs), state machines, logic circuitry, or other devices known to persons skilled in the art to process information or signals based on operational or programming instructions. The processor may be implemented using one or more controller technologies, such as Application Specific Integrated Circuit (ASIC), Reduced Instruction Set Computing (RISC) technology, Complex Instruction Set Computing (CISC) technology or other similar technology known to persons skilled in the art.

Wherever the context so applies in the present disclosure, the term "memory" may be regarded to include random access memory (RAM), read only memory (ROM). Moreover, the memory may incorporate electronic, magnetic, optical, and/or other types of storage media known to persons skilled in the art. Wherever the context so applies in the present disclosure, the term "local interface" may be regarded to include, for example, buses or other wired or wireless connections, as is known to persons skilled in the art. The local interface may have additional elements such as controllers, buffers (caches), drivers, repeaters, and receivers, among others to enable communications. Further, the local interface may include address, control, and/or data connections to enable appropriate communications among the aforementioned components.

The system 202 includes, among other components, a first transceiver 206, a first processor 208, and a first memory 210. The first transceiver 206, the first processor 208, and the first memory 210 cooperate with one another to enable operations of the system 202. These components may communicate with each other via a local interface (not shown), for example, using wired or wireless communication interfaces.

Although the system 202 is described herein and shown in the accompanying drawings as being implemented within a single computing device, it may be contemplated that in alternative configurations of the system 202, one or more components of the system 202 may be implemented in a distributed computing environment without deviating from the scope of the claimed subject matter. For example, the system 202 may be a cloud environment incorporating the operations of the first transceiver 206, the first processor 208, the first memory 210 and various other operating modules to serve as a software as a service model for the user device 204.

As illustrated in FIG. 2, the system 202 in the exemplary embodiment includes the first transceiver 206 to communicate data to and acquire data from other devices such as the user device 204, the loader 102a, and the hauler 102b. The first memory 210 is configured to store a set of instructions that are executable by the first processor 208 to perform operations that are consistent with the present disclosure. In some embodiments, the first memory 210 is also configured to store operational data associated with the machines 102. The first processor 208 is configured to execute the instructions stored in the first memory 210 to perform operations.

The user device 204 is operable as an interface by a user for interacting with the system 202. The user may utilize the user device 204 for providing one or more user inputs to the system 202 and receiving one or more outputs from the system 202. The user device 204 may include numerous electrical and electronic components that are coupled using signal conditioning circuitry, power circuitry, logic circuitry providing power, operational control, communication, and other user associated hardware known to persons skilled in the art. It will further be acknowledged by persons skilled in the art that the user device 204 is a personal computer, desktop computer, tablet, smartphone, or other computing devices known to persons skilled in the art. For sake of simplicity and ease of use, in some embodiments, the system 202 and the user device 204 may be implemented as a single device to perform the functions of the system 202 and the user device 204 that are consistent with the present disclosure.

The user device 204 includes, among other components, a second transceiver 214, an interface 216, a display 218, a second processor 220, and a second memory 222. The second transceiver 214, the interface 216, the display 218, the second processor 220, and the second memory 222 cooperate with one another to enable operations of the user device 204. These components may communicate with each other via a local interface (not shown), for example, using wired or wireless communication interfaces.

As illustrated in FIG. 2, the second transceiver 214 is configured to operably transmit user inputs from the user device 204 to the system 202 and receive outputs from the system 202. User inputs may be provided via the interface 216, for example, a touch screen display (such as, the display 218), a stylus, a touch pad, and/or a mouse or other user input mechanism known to persons skilled in the art. Outputs from the system 202 are graphically rendered on the user device 204. The interface 216 may further include, for example, a serial port, a parallel port, an infrared (IR) interface, a universal serial bus (USB) interface and/or other interfaces known to persons skilled in the art.

The display 218 may be configured to display data, maps, and images. The display 218 may include, for example, a computer monitor, or be embodied as a part of a mobile phone, a tablet, a phablet or another type of a portable, or handheld, device equipped with a graphical user interface (GUI) 224. The GUI 224 may be a firmware or a software application e.g., a web portal or other suitable visual and/or aural user interface known to persons skilled in the art. The GUI 224 includes one or more graphical elements including, but not limited to maps, graphical icons, control buttons, and selection boxes. These graphical elements may be used in conjunction with suitable text for prompting the user to provide inputs. Optionally, the graphical elements may be used for displaying information based on the one or more outputs from the system 202.

In some embodiments, the display 218 may be configured to display the GUI 224 associated with suggesting and facilitating customization of one or more operational zones for the worksite 100 by the user. The second memory 222 is a non-transitory memory configured to store a set of instructions that are executable by the second processor 220 to perform operations. The second processor 220 is configured to execute the instructions stored in the second memory 222 to perform the operations that are consistent with that disclosed in conjunction with the user device 204 herein. The second processor 220 is configured to cooperate with other components of the user device 204 to perform operations pursuant to enabling communications with the system 202.

In the present disclosure, explanation to the operation of the system 202 will be made in conjunction with one, i.e., a singular machine denoted using identical reference numeral '102'. However, it should be noted that such explanation is similarly and equally applicable to multiple machines, i.e., instances where more than one machine is present. In operation, the first processor 208 is configured to obtain the operational data associated with at least one type of machine, for example, the loader 102a and/or the hauler 102b, within the worksite 100. For example, the first processor 208 may be configured to obtain the operational data from the machine 102. In alternate embodiments, the first processor 208 may be configured to obtain the operational data based on the locations and the engine start and stop occurrences of the machine 102.

For instance, the first processor 208 may be configured to use the location associated with each machine 102 e.g., the loader 102a and the hauler 102b to determine the distance between the machines 102a, 102b. For sake of brevity, details pertaining to operations required in determining the distance between various machines have been omitted as such operations are known to persons having ordinary skill in the art. In some embodiments, the first processor 208 may be configured to determine the duration for which the distance between the loader 102a and the hauler 102b remains unchanged. Further, the first processor 208 is configured to determine the idle time of each machine 102 based on the engine start and stop occurrences of the machine 102. It will be acknowledged by persons skilled in the art that other techniques of obtaining the operational data may be used in lieu of that disclosed herein without deviating from the scope of the appended claims.

The first processor 208 is further configured to communicate with the user device 204, via the first transceiver 206, to display one or more operational areas corresponding to the operational zones 106, 108, 110 on the GUI 224 of the user device 204 based on the operational data meeting a threshold condition. To this end, the first processor 208 is configured to identify the operational zones 106, 108, 110 in the worksite 100 based on the threshold condition and subsequently, display the corresponding operational areas on the GUI 224.

In some embodiments, to identify a load zone 108, the first processor 208 is configured to identify a loading event associated with the load zone 108. The loading event may correspond to an event associated with the loader 102a digging work material such as earth, sand, or ore and additionally, or optionally, loading the dug work material on the hauler 102b. During the loading event, both the loader 102a and the hauler 102b are expected to be positioned in proximity, for example, less than 20 meters of each other for a certain time duration. The loading event may be regarded as complete when the hauler 102b starts moving, for example, towards the dump zone 110. In order to determine such events, the first processor 208 is configured to determine the distance between the loader 102a and the hauler 102b and the duration for which the distance remains unchanged.

The threshold condition includes at least one of the threshold distance between the hauler 102b with respect to the loader 102a, the threshold duration for which the distance remains unchanged, and a threshold number of loading events to be carried out at the worksite 100. The first processor 208 is configured to identify the loading event when the distance of the hauler 102b with respect to the loader 102a at a particular location of the worksite 100 is less than the threshold distance and the duration for which the distance remains unchanged is greater than or equal to the threshold duration. The first processor 208 is further configured to identify the particular location as the load zone 108 when a number of loading events exceeds the threshold number of loading events at the worksite 100.

In some embodiments, to identify a park zone, the first processor 208 is configured to first identify a parking event associated with the park zone 106. The parking event may correspond to an event associated with multiple loaders 102a and/or haulers 102b being parked in non-operational state at a particular location of the worksite 100. The non-operational state is a state when the machines 102 are stationary and their engines are inactive.

The threshold condition includes at least one of the threshold idle time of each machine 102 and a threshold number of parking events at the worksite 100. The first processor 208 is configured to identify the parking event when an idle time of a machine 102 at the particular location is greater than or equal to the threshold idle time. The first processor 208 is further configured to identify the particular location as the park zone 106 when a number of parking events at the particular location exceeds the threshold number of parking events at the worksite 100.

In accordance with some embodiments, to identify a dump zone 110, the first processor 208 is configured to identify a remaining zone devoid of the park zone 106 and the load zone 108 in the worksite 100 as the dump zone 110.

Figure 3:
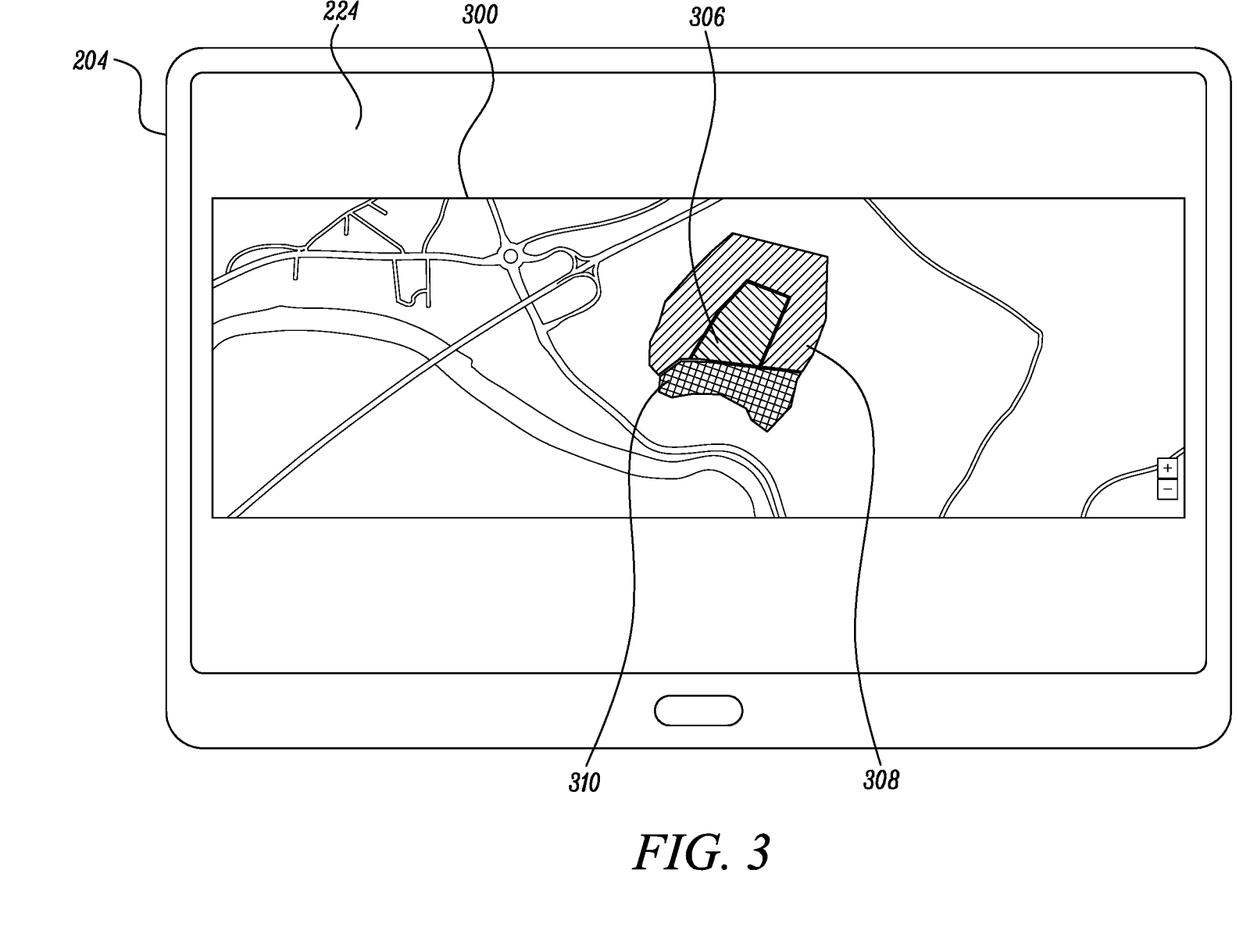
FIGS. 3-5 illustrate an exemplary Graphical User Interface (GUI) of a device for suggesting and facilitating customization of the one or more operational zones for the worksite by the user, according to an embodiment of the present disclosure.

The first processor 208 is further configured to determine the operational areas corresponding to the operational zones 106, 108, 110 for display on the GUI 224 of the user device 204. To this end, the first processor 208 is configured to utilize a map of the worksite 100 to identify one or more areas (hereinafter also referred to as "operational areas") corresponding to the operational zones 106, 108, 110 for the worksite 100 and mark the identified one or more operational areas on the map. The first processor 208 is configured to display the map along with the identified one or more operational areas on the GUI 224 of the user device 204. FIG. 3 exemplarily shows a map 300 on the GUI 224 identifying the one or more operational areas 306, 308, 310 corresponding to the respective operational zones 106, 108, 110 for the worksite 100.

Referring again to FIG. 2, the first processor 208 is further configured to receive, via the first transceiver 206, one or more user inputs from the GUI 224 of the user device 204 to modify the one or more operational areas 306, 308, 310 displayed on the GUI 224 of the user device 204. The one or more user inputs may be received from the user of the user device 204. In accordance with some embodiments, the one or more user inputs may correspond to a change of location i.e., repositioning (entire operational area can be re-located to a different location in the worksite by the user) or a modification of the dimensions or boundaries of the identification of the one or more operational areas 306, 308, 310 displayed on the GUI 224.

Figure 4:
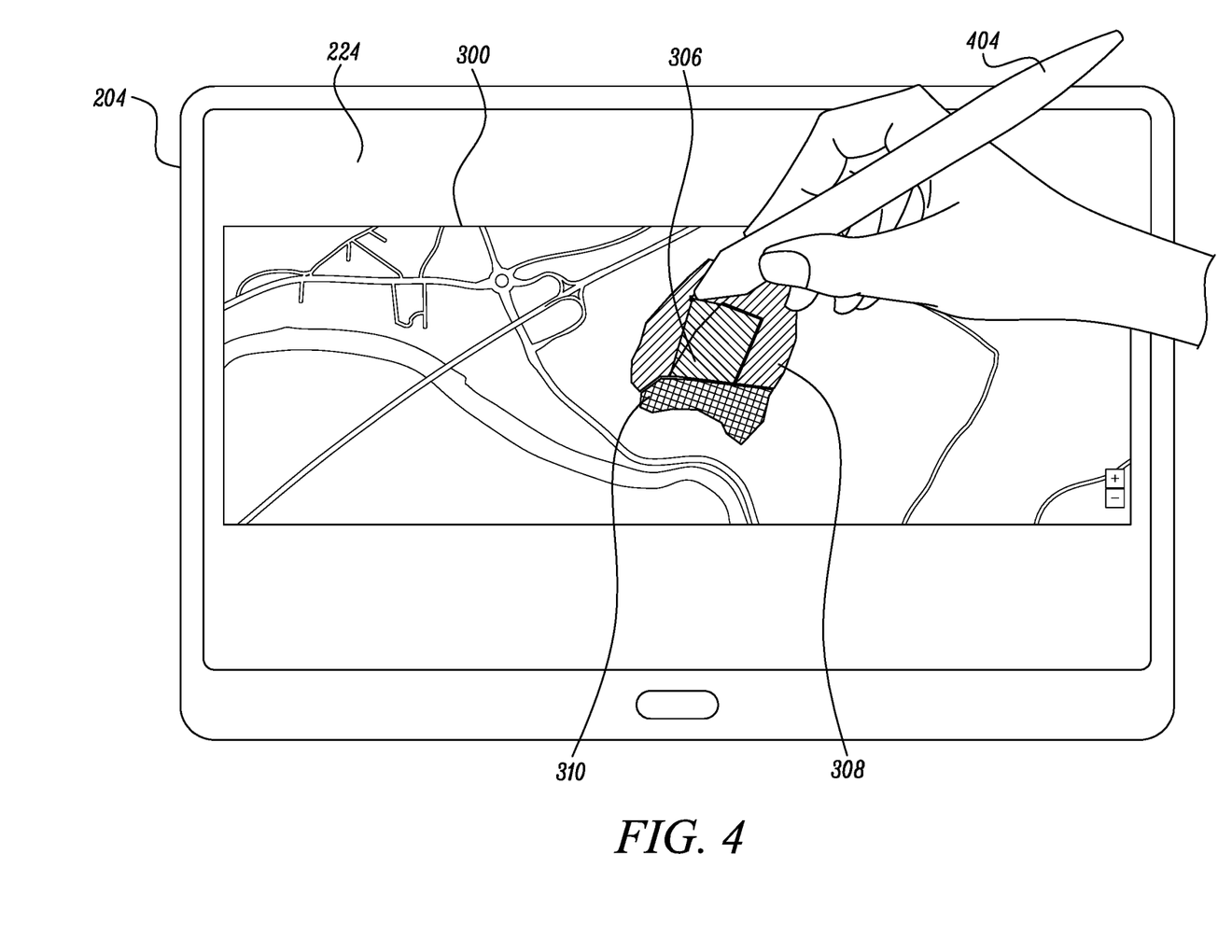

FIG. 4 illustrates the GUI 224 receiving the user inputs with the use of a stylus 404. As shown, the user may manually operate the stylus 404 (or other input mechanisms known to persons skilled in the art) over, or across, at least a portion of the GUI 224 to drag and modify the dimensions or boundaries of the one or more operational areas 306, 308, 310 displayed on the GUI 224 of the user device 204. The user may employ the stylus 404 (or any input mechanisms known in the art) to modify the identification of the one or more operational areas 306, 308, 310 displayed on the GUI 224 of the user device 204, using various techniques known to persons skilled in the art.

Referring back to FIG. 2, the first processor 208 is further configured to update the threshold condition based on the one or more user inputs to generate an updated threshold condition, as described in detail in the forthcoming disclosure. The first processor 208 is further configured to reconfigure the one or more operational areas 306, 308, 310 for subsequent display on the GUI 224 of the user device 204. In some embodiments, the first processor 208 reconfigures the one or more operational areas 306, 308, 310 if operational data subsequently received at the first processor 208 satisfies the updated threshold condition. To this end, the first processor 208 is configured to re-identify operational zones 106, 108, 110 in the worksite 100 based on the updated threshold condition and subsequently, reconfigure the corresponding one or more operational areas on the GUI 224.

In an exemplary implementation, the updated threshold conditions include at least one of an updated threshold distance, an updated threshold duration, and an updated threshold number of loading events to be carried out at the worksite 100. In such cases, the first processor 208 is configured to identify a loading event when the distance of the hauler 102b with respect to the loader 102a at a particular location of the worksite 100 is less than the updated threshold distance and the duration for which the distance remains unchanged is greater than or equal to the updated threshold duration. The first processor 208 is further configured to identify the load zone 108 when a number of loading events exceeds the updated threshold number of loading events at the worksite 100.

In exemplary embodiments, the updated threshold condition includes at least one of an updated threshold idle time and an updated threshold number of parking events at the worksite 100. The first processor 208 is configured to identify the parking event when an idle time of the machine 102 at a particular location is greater than or equal to the updated threshold idle time. The first processor 208 is further configured to identify the park zone 106 when a number of parking events exceeds the updated threshold number of parking events at the worksite 100. In some embodiments, to identify the dump zone 110, the first processor 208 is configured to identify a zone devoid of, or other than, the park zone 106 and the load zone 108 in the worksite 100 as the dump zone 110.

Figure 5:
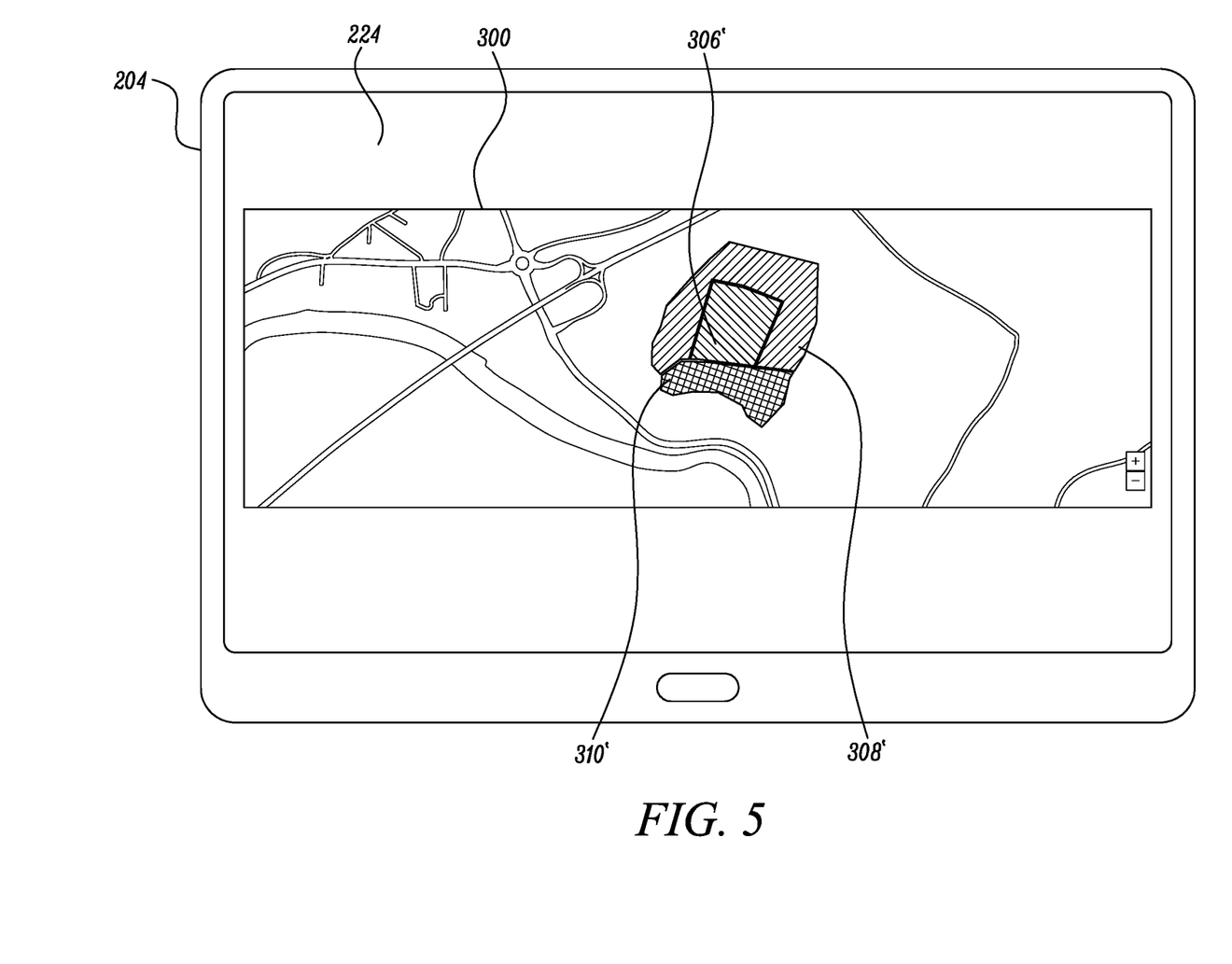

The first processor 208 is further configured to reconfigure the one or more operational areas 306, 308, 310 displayed on the GUI 224 of the user device 204. To this end, the first processor 208 is configured to adjust the dimensions and/or identification of the one or more operational areas 306, 308, 310 on the map 300 displayed on the GUI 224 of the user device 204 based on the operational zones 106, 108, 110 for the worksite 100. For example, as shown in FIG. 5, the dimensions or boundaries of the one or more operational areas 306, 308, 310 on the map 300 displayed on the GUI 224 are reconfigured to obtain the one or more reconfigured operational areas 306', 308', 310' corresponding to the operational zones 106, 108, 110 for the worksite 100.

The detailed working of the system 202 for determining the threshold conditions and generating the updated threshold conditions are described in detail in the forthcoming disclosure. In an embodiment, these threshold conditions may be determined and continuously, or continually, updated by the system 202 based on machine learning to improve the accuracy of the system 202 in suggesting operational areas 306, 308, 310. In some embodiments, the system 202 is configured to determine and update the threshold conditions using one or more machine learning models. To this end, the system 202 may additionally include a machine learning module 212 configured to be trained for determining and generating the updated threshold conditions by using one or more machine learning algorithms.

The machine learning module 212 is configured to execute the instructions stored in the first memory 210 to perform one or more operations consistent with the present disclosure. As shown in FIG. 2, the machine learning module 212 may include an observation module 240, a learning module 242, and a decision module 244. The machine learning module 212 may be embodied as a data processor and/or a mainframe employing artificial intelligence (AI) to perform operations consistent with the present disclosure. In some embodiments, the machine learning module 212 may be implemented within the first processor 208. However, in alternative embodiments, the machine learning module 212 could be implemented using a specially constructed computing platform for carrying out the operations as described herein. The machine learning module 212 may be implemented or provided with a wide variety of components or systems (not shown), including one or more of memories, registers, and/or other data processing devices and subsystems.

The machine learning module 212 may employ one or more of the following computational techniques: neural network, constraint program, fuzzy logic, classification, artificial intelligence, symbolic manipulation, fuzzy set theory, evolutionary computation, cybernetics, data mining, approximate reasoning, derivative-free optimization, decision trees, and/or soft computing.

The machine learning module 212 may implement an iterative learning process. The learning may be based on a wide variety of learning rules or training algorithms. The learning rules may include one or more of back-propagation, patter-by-pattern learning, supervised learning, and/or interpolation. As a result of the learning, the machine learning module 212 may learn to generate or determine the threshold conditions for identifying the one or more operational zones 106, 108, 110.

The observation module 240 is configured to receive a training data set and a validation data set. The observation module 240 may be configured to receive multiple parameters as input parameters in the training data set. In an exemplary implementation, the parameters may include distance of the hauler 102b with respect to the loader 102a, a duration for which the distance remains unchanged, and a number of loading events carried out at the worksite 100. In some exemplary implementations, the parameters may include an idle time of a machine at a particular location and a number of parking events carried out at the worksite 100. The observation module 240 is further configured to receive the operational zone 106, 108, 110 corresponding to the respective parameters as output in the training dataset. Further, the observation module 240 is configured to receive the validation dataset including only the input parameters.

Based on the training dataset, the learning module 242 is configured to learn by correlating the operational zone 106, 108, 110 and the input parameters. In an embodiment of the present disclosure, the decision module 244 is configured to determine one or more correlations between the input parameters and the operational zone 106, 108, 110. For example, the decision module 244 may be configured to generate or determine the threshold conditions for each of the load zone 108 and the park zone 106 based on the determined correlations between the input parameters and the operational zone 106, 108, 110. The learning module 242 is further configured to test the determined correlations on the validation dataset to determine the operational zone 106, 108, 110 corresponding to the input parameters in the validation dataset.

The observation module 240 is further configured to continuously receive the operational data and the one or more user inputs associated with reconfiguration of the one or more operational areas 306, 308, 310 corresponding to the one or more operational zones 106, 108, 110 as the training data set. The learning module 242 is then configured to learn by correlating the operational data and the one or more user inputs. In an embodiment of the present disclosure, the decision module 244 is configured to determine one or more correlations between the one or more user inputs and the operational data, and update the threshold conditions based on the determined one or more correlations.

INDUSTRIAL APPLICABILITY

Figure 6:
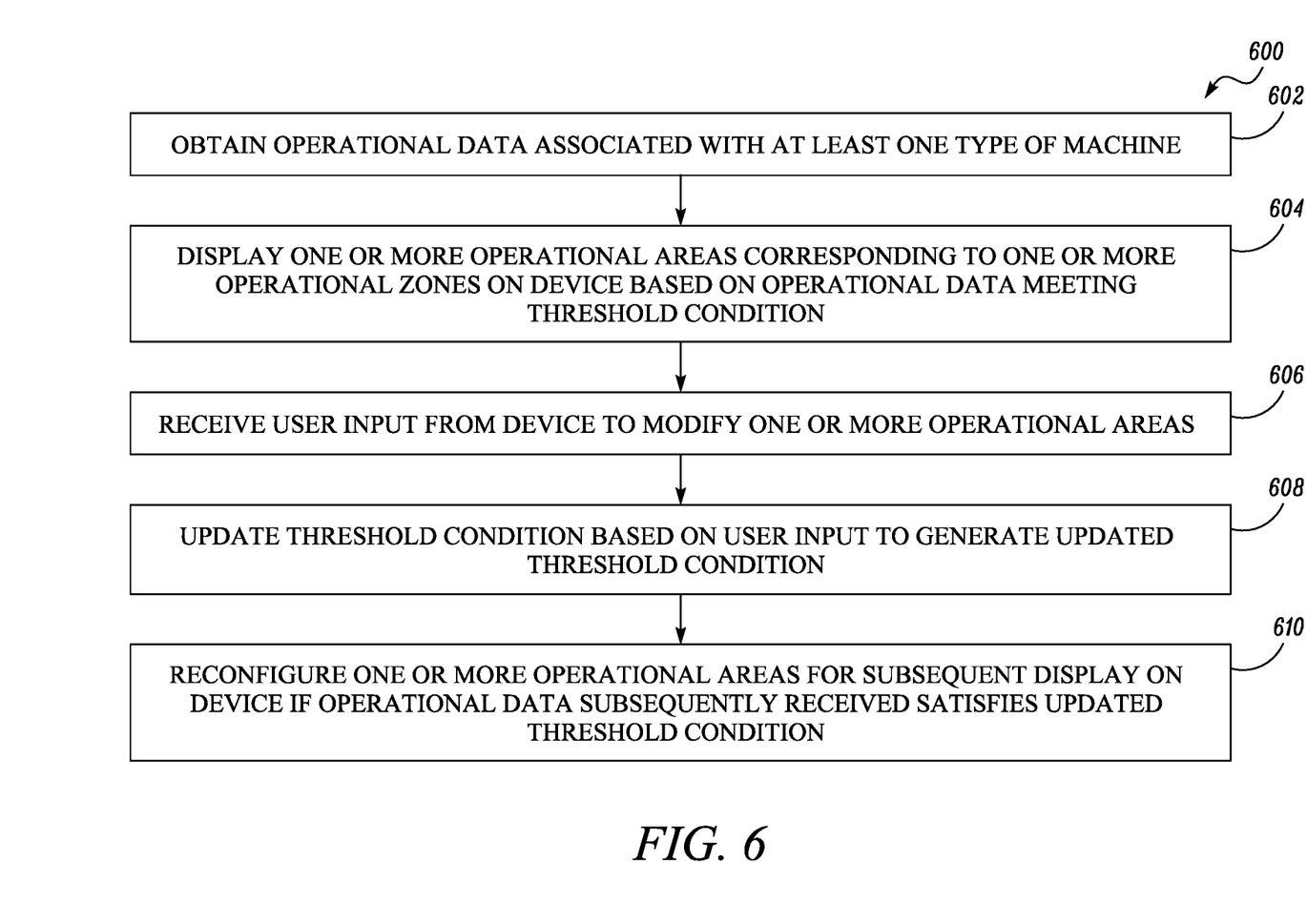
FIG. 6 illustrates an exemplary method for suggesting and customizing the suggested operational zones for the worksite on the device, according to an embodiment of the present disclosure.

FIG. 6 shows a method 600 for suggesting and facilitating customization of the operational zones 106, 108, 110 for the worksite 100 by the user on the user device 204 having the GUI 224, in accordance with an embodiment of the present disclosure. At step 602, the first processor 208 obtains operational data associated with at least one type of machine 102 within the worksite 100. At step 604, the first processor 208 displays one or more operational areas 306, 308, 310 corresponding to the one or more operational zones 106, 108, 110 on the GUI 224 of the user device 204 based on the operational data meeting a threshold condition. At step 606, the first processor 208 receives one or more user inputs from the GUI 224 of the user device 204 to modify the one or more operational areas 306, 308, 310 displayed on the GUI 224 of the user device 204. At step 608, the first processor 208 updates the threshold condition based on the one or more user inputs to generate an updated threshold condition. At step 610, the first processor 208 reconfigures the one or more operational areas 306, 308, 310 for subsequent display on the GUI 224 of the user device 204 if operational data subsequently received at the first processor 208 satisfies the updated threshold condition.

Implementation and use of the method 600 and system 202 of the present disclosure allows users to optimally designate the operational zones 106, 108, 110 for the worksite 100 as well as precisely determine the dimensions or boundaries of each operational zone 106, 108, 110 for the worksite 100. With the help of machine learning, the system 202 continuously, or continually, learns and updates the training data set for application on subsequent test data based on the feedback of the user. The optimal designation and precise determination of the operational zones 106, 108, 110 provide accurate productivity and efficiency not only of the machines 102 i.e., machine productivity but also the operations performed at the worksite 100 i.e., improved worksite productivity.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A computer-implemented method for suggesting and facilitating customization of one or more operational zones for a worksite by a user on a device having a Graphical User Interface (GUI), the computer-implemented method comprising:
    obtaining, by a processor, operational data associated with at least one type of machine within the worksite, the operational data indicative of a type of the operational zone including one of a load zone, a dump zone, and a park zone;
    displaying, by the processor, one or more operational areas corresponding to the one or more operational zones on the GUI of the device based on the operational data meeting a threshold condition;
    receiving, by the processor, one or more user inputs from the GUI of the device to modify the one or more operational areas displayed on the GUI of the device;
    updating, by the processor, the threshold condition based on the one or more user inputs to generate an updated threshold condition and
    reconfiguring, by the processor, the one or more operational areas for subsequent display on the GUI of the device when operational data subsequently received at the processor satisfies the updated threshold condition.

2. The computer-implemented method of claim 1, wherein the updated threshold condition is generated based on one or more machine learning algorithms.

3. The computer-implemented method of claim 1, wherein the at least one type of machine includes a hauler and a loader, and wherein the operational data includes one or more of a distance of the hauler with respect to the loader and a duration for which the distance remains unchanged and wherein:
    the threshold condition includes at least one of a threshold distance, a threshold duration, and a threshold number of loading events to be carried out at the worksite, and
    the updated threshold condition includes at least one of an updated threshold distance, an updated threshold duration, and an updated threshold number of loading events to be carried out at the worksite.

4. The computer-implemented method of claim 3, wherein displaying the one or more operational areas includes:
    identifying, by the processor, a loading event when:
        the distance of the hauler with respect to the loader at a particular location of the worksite is less than the threshold distance or the updated threshold distance, and
        the duration for which the distance remains unchanged is greater than or equal to the threshold duration or the updated threshold duration.

5. The computer-implemented method of claim 4, wherein displaying the one or more operational areas includes:
    identifying, by the processor, a load zone when a number of loading events exceeds the threshold number of loading events or the updated threshold number of loading events at the worksite; and
    displaying, by the processor, an operational area from the one or more operational areas corresponding to the load zone on the GUI of the device.

6. The computer-implemented method of claim 1, wherein the operational data includes an idle time of each machine, and wherein:
    the threshold condition includes at least one of a threshold idle time and a threshold number of parking events at the worksite, and
    the updated threshold condition includes at least one of an updated threshold idle time and an updated threshold number of parking events at the worksite.

7. The computer-implemented method of claim 6, wherein displaying the one or more operational areas includes:
    identifying, by the processor, a parking event when:
        an idle time of a machine at a particular location is greater than or equal to the threshold idle time or the updated threshold idle time.

8. The computer-implemented method of claim 7, wherein displaying the one or more operational areas includes:
    identifying, by the processor, a park zone when a number of parking events exceeds the threshold number of parking events or the updated threshold number of parking events at the worksite; and
    displaying, by the processor, an operational area from the one or more operational areas corresponding to the park zone on the GUI of the device.

9. The computer-implemented method of claim 1, wherein displaying the one or more operational areas includes:
    identifying, by the processor, a remaining zone devoid of the park zone and the load zone in the worksite as a dump zone; and
    displaying, by the processor, an operational area from the one or more operational areas corresponding to the dump zone on the GUI of the device.

10. A device for suggesting and facilitating customization of one or more operational zones for a worksite by a user, the device comprising:
a memory; and
a processor, wherein the processor is communicatively coupled to the memory, wherein the memory stores instructions executable by the processor, and wherein upon execution of the stored instructions the processor is configured to:
obtain operational data associated with at least one type of machine within the worksite, the operational data indicative of a type of the operational zone including one of a load zone, a dump zone, and a park zone,
display one or more operational areas corresponding to the one or more operational zones on a Graphical User Interface (GUI) of the device based on the operational data meeting a threshold condition,
receive one or more user inputs from the GUI of the device to modify the one or more operational areas displayed on the GUI of the device,
update the threshold condition based on the one or more user inputs to generate an updated threshold condition, and
reconfigure the one or more operational areas for subsequent display on the GUI of the device when operational data subsequently received at the processor satisfies the updated threshold condition.

11. The device of claim 10, wherein the processor is configured to generate the updated threshold condition based on one or more machine learning algorithms.

12. The device of claim 10, wherein the at least one type of machine includes a hauler and a loader, and wherein the operational data includes one or more of a distance of the hauler with respect to the loader and a duration for which the distance remains unchanged and wherein:
the threshold condition includes at least one of a threshold distance, a threshold duration, and a threshold number of loading events to be carried out at the worksite, and
the updated threshold condition includes at least one of an updated threshold distance, an updated threshold duration, and an updated threshold number of loading events to be carried out at the worksite.

13. The device of claim 12, wherein the processor is configured to display the one or more operational areas by:
identifying a loading event when:
the distance of the hauler with respect to the loader at a particular location of the worksite is less than the threshold distance or the updated threshold distance, and
the duration for which the distance remains unchanged is greater than or equal to the threshold duration or the updated threshold duration.

14. The device of claim 13, wherein the processor is configured to display the one or more operational areas by:
identifying a load zone when a number of loading events exceeds the threshold number of loading events or the updated threshold number of loading events at the worksite; and
displaying an operational area from the one or more operational areas corresponding to the load zone on the GUI of the device.

15. The device of claim 10, wherein the operational data includes an idle time of each machine and wherein
the threshold condition includes at least one of a threshold idle time and a threshold number of parking events at the worksite, and
the updated threshold condition includes at least one of an updated threshold idle time and an updated threshold number of parking events at the worksite.

16. The device of claim 15, wherein the processor is configured to display the one or more operational areas by:
identifying a parking event when:
an idle time of a machine at a particular location is greater than or equal to the threshold idle time or the updated threshold idle time.

17. The device of claim 16, wherein the processor is configured to display the one or more operational areas by:
identifying a park zone when a number of parking events exceeds the threshold number of parking events or the updated threshold number of parking events at the worksite; and
displaying an operational area from the one or more operational areas corresponding to the park zone on the GUI of the device.

18. The device of claim 10, wherein the processor is configured to display the one or more operational areas by:
identifying a remaining zone devoid of the park zone and the load zone in the worksite as a dump zone; and
displaying an operational area from the one or more operational areas corresponding to the dump zone on the GUI of the device.

19. A non-transitory computer readable medium having stored thereon a code comprising a set of instructions when executed by a processor of a computer configure the processor to:
obtain operational data associated with at least one type of machine within the worksite, the operational data indicative of a type of the operational zone including one of a load zone, a dump zone, and a park zone;
display one or more operational areas corresponding to the one or more operational zones on a Graphical User Interface (GUI) of a device based on the operational data meeting a threshold condition;
receive one or more user inputs from the GUI of the device to modify the one or more operational areas displayed on the GUI of the device;
update the threshold condition based on the one or more user inputs to generate an updated threshold condition; and
reconfigure the one or more operational areas for subsequent display on the GUI of the device when operational data subsequently received at the processor satisfies the updated threshold condition.

* * * * *